US008521086B2

(12) United States Patent
Bradley

(10) Patent No.: US 8,521,086 B2
(45) Date of Patent: Aug. 27, 2013

(54) PAIRING AN ACCESSORY WITH A HOST DEVICE USING ACCESSORY OUTPUT DEVICE

(75) Inventor: Robert Bradley, San Jose, CA (US)

(73) Assignee: Apple Inc., Cupertino, CA (US)

( * ) Notice: Subject to any disclaimer, the term of this patent is extended or adjusted under 35 U.S.C. 154(b) by 214 days.

(21) Appl. No.: 13/044,764

(22) Filed: Mar. 10, 2011

(65) Prior Publication Data

US 2012/0231740 A1    Sep. 13, 2012

(51) Int. Cl.
*H04B 7/00* (2006.01)
(52) U.S. Cl.
USPC ......... 455/41.2; 455/41.3; 455/411; 370/320; 370/342
(58) Field of Classification Search
USPC ............... 455/41.2, 41.3, 411; 370/320, 342, 370/441
See application file for complete search history.

(56) References Cited

U.S. PATENT DOCUMENTS

| 7,486,170 | B2 | 2/2009 | Kimura |
| 7,505,597 | B2* | 3/2009 | Stevens et al. ................. 380/270 |
| 2004/0073795 | A1 | 4/2004 | Jablon |
| 2007/0226497 | A1 | 9/2007 | Taylor |
| 2009/0190189 | A1 | 7/2009 | Suga |
| 2010/0112979 | A1* | 5/2010 | Chen et al. .................... 455/411 |
| 2010/0306538 | A1 | 12/2010 | Thomas |
| 2010/0325654 | A1* | 12/2010 | Moroney et al. ................ 725/30 |

* cited by examiner

*Primary Examiner* — Tuan H Nguyen
(74) *Attorney, Agent, or Firm* — Blakely, Sokoloff, Taylor & Zafman LLP

(57) ABSTRACT

A method for pairing an accessory with a host device includes placing an output device of the accessory into a randomly selected state N-times. The information about the current state of the accessory is provided to a host device after each state selection for N number of times. Thereafter, the host device generates an authentication code based on the N inputs and the accessory generates another authentication code based on the N selected states. The authentication codes can be then compared and can be used to "pair" the host device and the accessory, allowing secure communication.

19 Claims, 6 Drawing Sheets

PAIRING AN ACCESSORY WITH A HOST DEVICE USING ACCESSORY OUTPUT DEVICE

BACKGROUND

The present disclosure relates generally to pairing an accessory with a host device and more particularly to pairing an accessory without use of displayed or printed authentication information.

A number of wireless peripherals are being designed to work with host devices. One example of such a system is the AirPlay system from Apple Inc. In the AirPlay system, media stored on a host device, e.g., a computer, can be wirelessly communicated to one or more peripheral devices, e.g., speakers. However, in order for the peripheral devices to interact with the host device, they must be properly configured or "paired."

Conventionally, a peripheral device has an authentication identifier such as a serial number, passcode, etc. that can be either present in a printed form on the peripheral device or can be retrieved via a user interface of the peripheral device. The authentication identifier can then be used to pair the accessory with the host device. However, such an authentication identifier is static and thus vulnerable to theft and misuse. In addition, a person with disabilities or with limited technical skills can find it difficult to perform the pairing of the host device and the peripheral device using the authentication identifier.

SUMMARY

Embodiments of the present invention generally relate to pairing of devices. Certain embodiments of the present invention provide methods for pairing an accessory with a host device without using a static authentication identifier.

In some embodiments, the accessory can be programmed to perform a sequence of state-setting operations on an output device, where each state-setting operation randomly places the output device in one of a number of states. In one embodiment in which the output device is an illumination device, the states are an ON state and an OFF state. Information about the sequence of states of the output device can be provided to the host device. Both the host device and the accessory can generate a passcode using the sequence of state information and a same encryption algorithm. The accessory can then use this passcode to communicate with the host device to complete the pairing process. In some embodiments, the information about the sequence of states can be provided to the host device via an out-of-band communication channel that does not involve the accessory directly communicating the information about the generated states to the host device. This reduces the possibility that someone can intercept the information by monitoring the communications between the accessory and the host device.

In other embodiments, the accessory may randomly generate a series of audio tones and use that information to generate the passcode. The audio tones and their order can be communicated to the host device so that the host device can also generate the same passcode. The accessory can then use the passcode to communicate with the host device and complete the pairing process. In some embodiments, the accessory and/or the host device may audibilize the passcode.

The following detailed description together with the accompanying drawings will provide a better understanding of the nature and advantages of the present invention.

DETAILED DESCRIPTION

Embodiments of the present invention are generally related to pairing of devices. More particularly, embodiments of the present invention provide a method for pairing an accessory with a host device without the need for a displayed or printed authentication identifier. In some embodiments, an accessory may not include a display and/or may not have printed information indicating an authentication identifier, e.g., a serial number, which can be used to pair the accessory with a host device. In such an instance, an output device of the accessory, e.g., an illumination device or an audio device, can be used to generate a random identifier that can be used for pairing the accessory with the host device.

In some embodiments, an accessory randomly places an output device associated with the accessory, (e.g., an LED) in a first state or a second state (e.g., ON or OFF). This state setting can be performed N times to generate an N-bit code. After each state setting, a host device can be informed of the current state of the output device, e.g., by entering the state via an input device of the host device. Once information about all N state settings is provided to the host device, both the host device and the accessory can generate a passcode using the information about the sequence of states. Since both the accessory and the host device have same state sequence information, the passcodes generated by the host device and the accessory should also be the same. Once generated, the passcode can be used by the accessory to pair with the host device. If for some reason, the passcodes do not match, the whole process can be repeated again to generate a new N-bit code.

Figure 1:
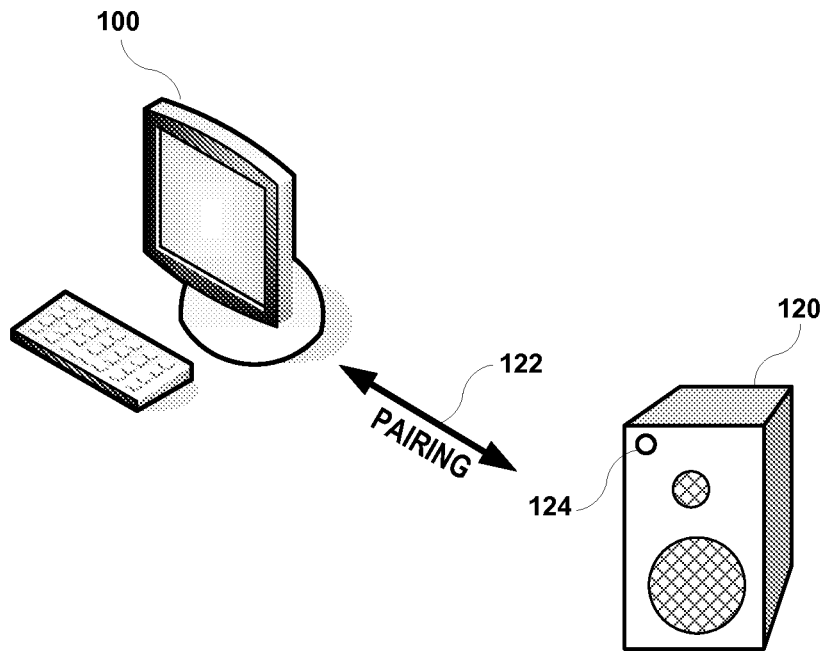
FIG. 1 illustrates a system according to certain embodiments of the present invention.

FIG. 1 illustrates a system that can be used in certain embodiments of the present invention. Shown in FIG. 1 are a host device 100, e.g., a personal computer, and accessory 120, e.g., a speaker. Host device 100 and accessory 120 each include a wireless communication interface, such as a standard WiFi card, and various other components, examples of which are described in detail below.

Host device 100 and accessory 120 can establish a secure, direct communication link 122 also referred to as a pairing. Once pairing 122 is established, host device 100 and accessory 120 can send messages to each other using the communication link. The pairing can be performed using information known only to accessory 120 and host device 100, e.g., an authentication identifier. In an embodiment, a state of an output device 124 can be communicated to host device as part of the pairing process. In some embodiments, host device 100 can concurrently establish multiple pairings with several accessories 120 (not shown). In other embodiments, host device 100 can be limited to establishing a pairing with one accessory at a time. Thus, for example, if accessory 120 begins pairing with host device 100, another accessory (not shown) might be required to wait until pairing 122 is fully established. In alternative embodiments, if accessory 120 attempts to initiate pairing with host device 100 while another accessory is in process of establishing its pairing, host device 100 may terminate communication with the other accessory to service the pairing request from accessory 120. Other rules for prioritizing pairing operations can also be used.

A host device can communicate with an accessory even before the pairing is complete. Pairing enables the host device and accessory to exchange messages securely and for the host device to establish and verify the authenticity of the accessory. Prior to establishing pairing, any messages sent between the host device and the accessory can be in an unencrypted format. In some embodiments, the messages can be encrypted. In some embodiments, the host device and the accessory can communicate with each other prior to pairing using messages referred to herein as "probe requests" and "probe responses," or more generally as "probes." The probes can be used to exchange a sequence of messages between two WiFi-enabled devices, including computers, mobile devices, peripherals, and other devices. Even though the host device and the accessory can communicate with each other using the probes, they may not necessarily be authenticated or "paired" until the pairing process is complete. For example, the host device may broadcast a probe when it senses the presence of an accessory, however the host device may not necessarily know details about the accessory that receives the probe. An accessory may receive the probe from the host device and if it can interpret the probe, the accessory can perform an action based on the probe.

It will be appreciated that the devices shown in FIG. 1 are illustrative and that variations and modifications are possible. For example, while host device 100 is depicted as being a personal computer, host device 100 can also be another type of device, including but not limited to a laptop computer, tablet computer, smart phone, mobile communication or computing device, and so on. In addition, host device 100 need not include significant computing capability; any device capable of performing host device operations as described herein can be used as a host device.

Likewise, accessory 120 can be any device with a wireless communication interface. Other examples of devices that can be accessories include printers, disk drives, peripheral devices, cameras, personal electronic devices including electronic medical devices, pressure and temperature monitoring devices, and household appliances. As with host device 100, any device capable of performing accessory operations as described herein can be used as an accessory. As will become apparent, an "accessory" is distinguished from a host device in that, during the pairing process, the accessory generates the random states of output device 124, which are communicated to host device 100.

In some embodiments, an accessory can be a device that has limited or no user interface. For example, accessory 120 can produce sound but need not have any components capable of detecting user action (e.g., buttons, dials, touch-sensitive areas, etc.). Similarly, other accessories can have a display capable of displaying a few characters or simply status lights. Such limited or nonexistent user interfaces can make it difficult or impossible for a user to input a network name, passcode, or other credential that may be required for joining a conventional secure wireless network. Some embodiments of the present invention allow accessories to generate dynamic passcodes using their outputs such as light and/or sound, simplifying the task of connecting such accessories to a wireless network.

Figure 2:
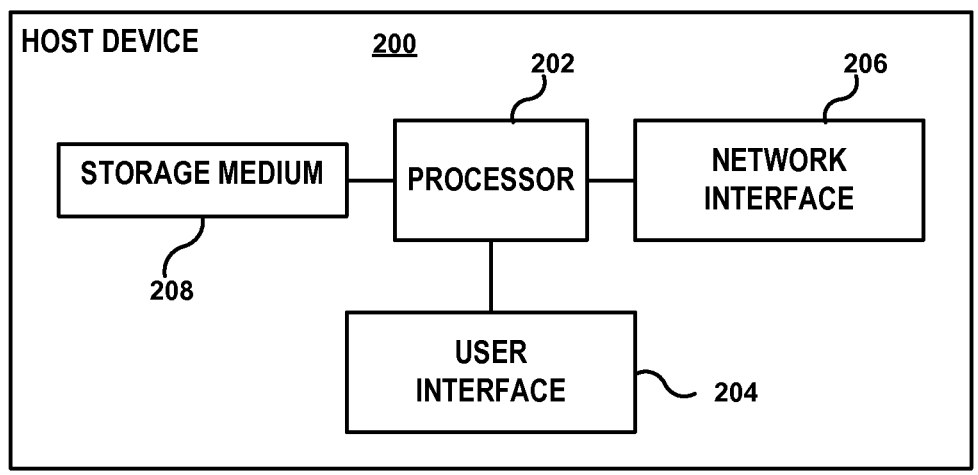
FIG. 2 is a block diagram of a host device according to an embodiment of the present invention.

FIG. 2 is a block diagram of a host device 200 according to an embodiment of the present invention. Host device 200 (e.g., implementing host device 100 of FIG. 1) can include various components such as a processor 202, a user interface 204, a network interface 206, and a storage medium 208.

Processor 202, which can be implemented as one or more integrated circuits (e.g., a conventional microprocessor or microcontroller), can control the operation of host device 200. In various embodiments, processor 202 can execute a variety of programs in response to program code and can maintain multiple concurrently executing programs or processes. At any given time, some or all of the program code to be executed can be resident in processor 202 and/or in storage media such as storage medium 208.

Through suitable programming, processor 202 can provide various functionality for host device 200. For example, in response to user input signals provided by user interface 204, processor 202 can launch application programs (word processor, web browser, etc.), generate an authentication code, play stored media content, control network interface 206 to establish or terminate network connections or send and receive data and other signals, and so on.

User interface 204 can include input devices such as a keyboard, touch pad, touch screen, scroll wheel, click wheel, dial, button, switch, keypad, microphone, or the like, as well as output devices such as a video screen, indicator lights, speakers, headphone jacks, or the like, together with supporting electronics (e.g., digital-to-analog or analog-to-digital converters, signal processors, or the like). A user can operate input devices of user interface 204 to invoke the functionality of host device 200 and can view and/or hear output from host device 200 via output devices of user interface 204.

Network interface 206 can provide data communication capability for host device 200. In some embodiments network interface 206 can include a wired interface such as Ethernet. In other embodiments, network interface 206 can include radio frequency (RF) transceiver components for accessing wireless voice and/or data networks (e.g., using advanced data network technology such as 3G, 4G or EDGE, WiFi (IEEE 802.11 family standards), or other wireless communication technologies, or any combination thereof). Network interface 206 can be implemented using a combination of hardware (e.g., antennas, modulators/demodulators, encoders/decoders, and other analog and/or digital signal processing circuits) and software components.

Storage medium 208 can be implemented, e.g., using disk, flash memory, or any other non-volatile storage medium. In some embodiments, storage medium 208 can store program code to be executed by processor 202 (including application and operating-system programs). This code can include program code related to generating a dynamic passcode as described below. Storage medium 208 can also store data such as media assets (audio, video, still images, etc.) that can be played or streamed to another device by host device 200, personal information electronic documents, and/or data files for a user, and other information. In some embodiments, storage medium 208 can store network credentials (e.g., network name and passcode) associated with specific wireless networks to which host device 200 can connect via network interface 206.

It will be appreciated that host device 200 is illustrative and that variations and modifications are possible. Host device 200 may have capabilities not specifically described herein (e.g., mobile telephony, satellite-based navigation) and need not have media playback capabilities. The term "host device" is used herein to refer generally to any device that can respond to a request for a secure wireless link, or pairing, and subsequently establish a pairing with another device.

In some embodiments, host device 200 can also exchange information with a user or another device using other input/output channels. Examples of other input/output channels include analog signals on an audio line in or line out path (e.g., an audio jack); a camera, bar code reader or other imaging device in combination with an image analyzer (for input); a display screen that can produce machine-readable images (for output); sensors such as an accelerometer, gyroscope, or proximity detector (via which motion, orientation, or position of the device can be used to input information to host device 200); non-visible (e.g., infrared) light detectors and/or transmitters; ultrasonic detectors and/or transmitters; and so on. In other embodiments, host device 200 can interact with the user by presenting a series of questions about the state of an output device of an accessory and accepting answers to the questions, e.g., via user interface 204.

Figure 3:
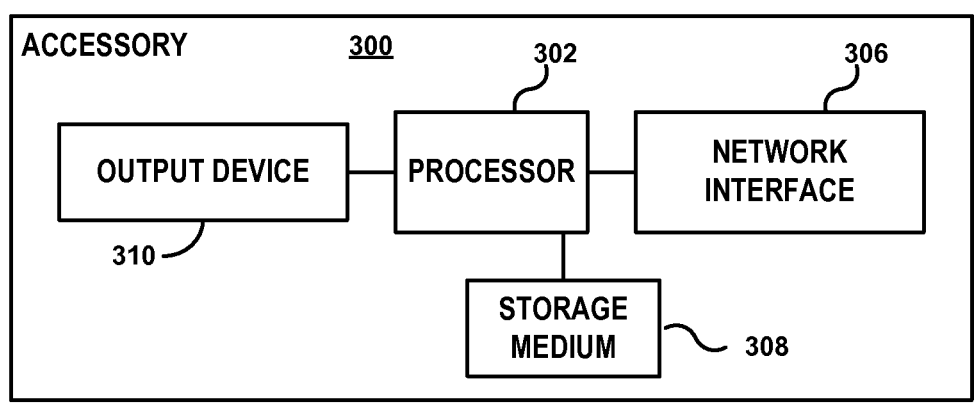
FIG. 3 is a block diagram of an accessory according to an embodiment of the present invention.

FIG. 3 is a block diagram of an accessory 300 according to an embodiment of the present invention. Accessory 300 (e.g., implementing accessory 120 of FIG. 1) can include a processor 302, a network interface 306, a storage medium 308, and output device 310.

Processor 302, which can be implemented as one or more integrated circuits (e.g., a conventional microprocessor or microcontroller), can control the operation of accessory 300. In various embodiments, processor 302 can execute a variety of programs in response to program code and can maintain multiple concurrently executing programs or processes. At any given time, some or all of the program code to be executed can be resident in processor 302 and/or in storage media such as storage medium 308.

Network interface 306 can provide at least data communication capability for accessory 300. In some embodiments network interface 306 can include radio frequency (RF) transceiver components for accessing wireless data networks (e.g., using 3G, 4G or EDGE, WiFi, or other mobile communication technologies, or any combination thereof). In other embodiments, network interface 306 can be wired, e.g., Ethernet. Network interface 306 can be implemented using a combination of hardware (e.g., antennas, modulators/demodulators, encoders/decoders, and other analog and/or digital signal processing circuits) and software components.

Storage medium 308 can be implemented, e.g., using disk, flash memory, or any other non-volatile storage medium. In some embodiments, storage medium 308 can store program code to be executed by processor 302 (including, e.g., code related to decoding digital audio received via wireless interface 306). This code can include program code related to establishing a pairing with a host device as described below. In some embodiments, storage medium 308 can also store program code for randomly selecting a state for output device 310. For example, if the output device is a light emitting diode (LED), the program code in storage medium 308 can randomly turn the LED on or off, toggle the LED between a blinking state and a steady state, etc.

Output device 310 can include an illumination device such as LED, an audio device such as a speaker, an optical indicator, or the like. In some embodiments, processor 302 can output information via output device 310 based on a program code. For example, processor 302 may output a sequence of short tones and/or long tones from output device 310 based on program code for randomly selecting state. Thus, in some embodiments, the state of output device 310 can be an audio tone of a certain duration and selecting the state of output device 310 can include selecting the duration of the audio tone to be emitted. The random selection can be truly random, e.g., based on a free running counter or can be pseudo-random, e.g., based on a pseudorandom number generator. In some embodiments, the state selection for output device 310 can be made based on instructions received from the host device. In some embodiments, output device 310 can have only two states, e.g., ON and OFF for an illumination device. In other embodiments, output device 310 may have more than two states, e.g., a multi-color light emitting device or a device which has a number of visually distinct states such as ON, OFF, and BLINKING.

It will be appreciated that accessory 300 is illustrative and that variations and modifications are possible. The term "accessory" as used herein refers generally to any device that can establish a pairing with a host device, and the communication link provided by the pairing can be used for any purpose, including but not limited to facilitating addition of the accessory to a network to which the host device already belongs. In some embodiments, data and control signals related to the accessory's function can be sent using the pairing link. Thus, accessories may be usable for a variety of purposes, including printing, playing sounds, displaying video, providing data (e.g., sensor readings) to the controller, receiving and processing data from the controller, and so on. Accessories are not limited to peripheral devices such as speakers or cameras; other examples include household appliances (e.g., refrigerators, conventional ovens, microwave ovens, laundry machines, etc.), pressure and temperature sensing and controlling devices (e.g., thermostats, pressure gauges, etc.), and personal electronic devices (e.g., workout monitors, electronic medical devices). Any device with a wireless interface and an output device can operate as an accessory.

Further, while host device 200 and accessory 300 have been described with reference to particular blocks as shown in FIGS. 2 and 3, it is to be understood that these blocks are defined for convenience of description and are not intended to imply a particular physical arrangement of component parts. Further, the blocks need not correspond to physically distinct components. Blocks can be configured to perform various operations, e.g., by programming a processor or providing appropriate control circuitry, and various blocks might or might not be reconfigurable depending on how the initial configuration is obtained. Embodiments of the present invention can be realized in a variety of apparatus including electronic devices implemented using any combination of circuitry and software.

In operation, the host device may send a count N (a positive integer) to the accessory indicating how many times the accessory is to select the state of its output device. In some embodiments, a minimum value for N (e.g., 8, 10, or other value) may be set by the host device. Thereafter, the host device can instruct the accessory to select a first state for the output device, e.g., using a probe. In response to the request, the accessory can select a state for the output device, e.g., turn the LED on. The choice of state of the output device is controlled by the accessory, and the accessory can select a state in any desired manner, e.g., randomly. Thus the host device instructs the accessory to select a state but does not control the selection.

Once the host device sends the instruction to the accessory, the host device may present a user with a query (e.g., either visually or audibly) asking the user to indicate the state of the output device, e.g., on a display of the host device. For example, the query may be a visual query in which the question "Is the light on or off?" is displayed on the user interface displayed on the host display or touch screen. In an alternative embodiment, the query may be an audible query in which a recorded question "Is the light on or off?" is audibly presented to the user. The user can provide a response to the host, e.g., by inputting "on" or "off", via an input device of the host. In other embodiments, the user may respond to the query by audibly stating "yes" or "no." The host device can record and interpret the user response (e.g., using a speech-to-text engine and/or voice recognition) to determine the answer to the query.

Once the user answers the query, the host device can note the user's answer and send another request to the accessory to select another state (same or different) and place the output device in the selected state. In response to the request, the accessory can place the output device in the second state. The user can then be presented with another query to input the current state of the output device. This process can be repeated N times with the user entering the state of the output device after each query is presented to the user by the host device.

After the process is repeated N times, both the accessory and the host device have information representing the same sequence of N states of the accessory's output device. Specifically, the accessory has the N state information since the accessory selected each of the N states in response to each of the N host requests. On the other hand, the host received the N state information from each of the user's N answers to the host's N queries through the host's user interface. In other words, the N state information is not transmitted directly between the accessory and the host device; the user acts as an intermediary in transferring the state information.

In one embodiment, the host can generate a passcode by forming a concatenated input including at least one identifier and the N state information and applying an encoding algorithm to the concatenated input. In some embodiments, more than one identifier can be used along with the N state information to generate the concatenated input. In some embodiments, the host can determine the identifier to be used and communicate that to the accessory. The determined identifier is common to both the accessory and the host device. In some embodiments, the identifier can be unique to each accessory and the host device may include a table listing information about an identifier and its associated accessory. The identifier can be numeric, alphanumeric, or include any other suitable sequence of characters. In some embodiments, where more than one identifier is used, e.g., two identifiers, a first identifier can be the same as a second identifier. In other embodiments, the first and the second identifiers can be different. In some embodiments, during the initial communication, the accessory can send some identifying information about itself, e.g., model number, which can be used by the host device to look up the identifier for that accessory. In other embodiments, the accessory may send the identifier to the host device using one or more of the probes. The only requirement is that the host device and the accessory both use the same identifier for each instance of determining the passcode. For example, if the host uses "LED STATE" as the identifier, then the accessory also uses "LED STATE" as the identifier. The identifier or identifiers are used to mask the N-bit state information so that the N-bit state information is protected from external attacks such as a pre-computed dictionary attack.

Once the host device determines the identifier, it can generate a concatenated input by concatenating the identifier and the N states to generate a passcode. For example, suppose that N=8, and that LED ON=1, and that LED OFF=0. Thus in this example, after the N states information is received, both the host and the accessory will have a same 8-bit code, e.g., 10001001. Also, suppose that the identifier is "LED STATE." The host can form a concatenated input by combining the 8-bit code and the identifier, e.g., LED STATE+10001001. In order to generate the concatenated input, the identifier can be converted to its binary equivalent prior to forming the concatenated input. One skilled in the art will realize that any other concatenation method can be used. It is to be noted that the example described above is for illustrative purpose only. The identifier and the N-states information can be arranged in any manner to form the concatenated input, e.g., LED STATE+10001001 or 10001001+LED STATE, etc. In other words, the order of the identifier and the N-states information is not important. In embodiments where more than one identifier is used, the selected identifiers may not have any relationship with each other. In other words, the selected identifiers can be completely random as long as both the accessory and the host device use the same identifiers. Also, in embodiments where more than one identifier is used, the identifiers and the N-states information need not be arranged in any specific order before generating the passcode.

The host device can then encode or encrypt the concatenated input, e.g., by using any suitable algorithm such as e.g., SHA 256, to generate a passcode. The accessory can also perform a corresponding concatenation and encoding process to generate a passcode. The accessory can then use the generated passcode to pair with the host device. The host device can then proceed to configure the accessory for use with the host device. In some embodiments, the host device can communicate the identifier to the accessory, which can then perform the concatenation as described above and apply the same encoding algorithm to the concatenated input to generate the passcode. Once the accessory generates the passcode, it can use the passcode to pair with the host device. Since the host device also has the same passcode that it generated, the host device can verify whether the passcode received from the accessory is same as the passcode that it generated. If the two passcodes are the same, the host device can grant access to the accessory. Once the accessory is paired with the host device, the host device can configure the accessory using a configuration routine associated with that accessory or exchange other information as desired.

Since the accessory and the host device independently generate the passcode based on the state of an output device of the accessory, there is less likelihood that an external entity can tamper with either the host device or the accessory. In addition, the techniques described above greatly enhance the accessibility and user friendliness of the system. Typically, setting up and configuring a system involving multiple components can be a daunting task for many people. By using a commonly understood idea such as reporting the state of an LED, the pairing and configuration of devices can be greatly simplified for an average user. Also, in instances where the host device and the accessory are at an extended distance from each other, e.g., in separate rooms, it is much easier to use visual indicia such as an LED state, so that a single user can easily configure the devices without additional help.

In some embodiments, as the host device sends instructions to the accessory for selecting successive states of the output device, the accessory can keep a count of the number of such instructions received from the host device and compare them to the count N received from the host at the beginning of the process. After the accessory determines that it has received N number of instructions from the host to select the state of its output device, the accessory can conclude that there is no further need to continue selecting more states of the output device. So, if the accessory receives another instruction to change the state of the output device, the accessory can ignore the request. In other embodiments, the host device can send a message signaling "START" of the process and after the N number of inputs is received by the host device, it may send an "END" signal to the accessory indicating that no more state selections are to be made. These signals can be sent by the host device in addition to or in lieu of sending the count N to the accessory. Thus, even if the "START" and "END" signals are intercepted by an unauthorized entity, there would be no way of knowing the actual states of the output device since that information is not transmitted directly between the accessory and the host device.

In some embodiments, the host device can choose the number N based on the accessory that is requesting pairing. For example, for accessories with complex/critical functionality, e.g., a heart rate monitor, the host may choose a higher value of N compared to an accessory that is less complex/critical, e.g., a speaker. In some embodiments, the value of N may range between 1 and 64.

Figure 4:
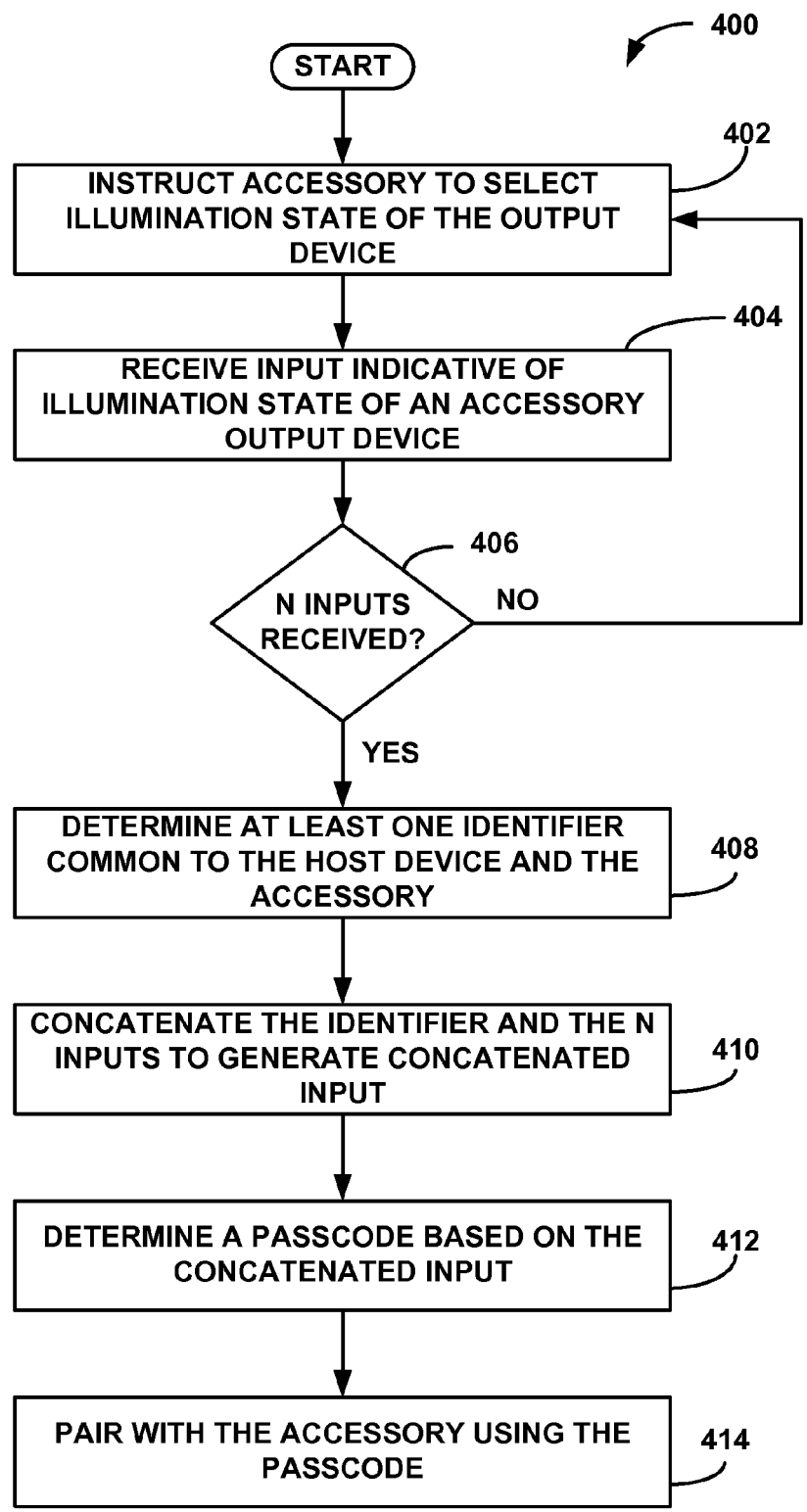
FIG. 4 illustrates information provided to the host device according to an embodiment of the present invention.

As described above, a host can pair with an accessory by using information about the state of the output device of the accessory to generate a random code (i.e., a concatenated input), which can be then used to generate a passcode for pairing the host and the accessory. FIG. 4 is flow diagram of a process 400 for establishing pairing between a host device and an accessory according to an embodiment of the present invention. Process 400 can be performed e.g., by host device 200 of FIG. 2. Process 400 illustrates the instance where the output device is an illumination device. For ease of explanation, the accessory in process 400 is assumed to have an illumination device as its output device.

At block 402, the host device can instruct the accessory to select the state for the output device. Thereafter the host device can receive input (e.g., user's answer to the host's query) indicating an illumination state of the output device of the accessory (block 404). For example, the host device may send a probe to instruct the accessory to select a state for the output device. In some embodiments, the current state and the next state can be the same. In response to the request, the accessory can select and set a state for the output device. The host device can then receive input indicating the current state of the output device. As described above, the accessory can be programmed to randomly select the state of its output device, e.g., a LED. In some embodiments, the accessory may turn the LED ON or OFF. In other embodiments, the accessory may toggle the LED between a blinking state and a non-blinking steady state. It is to be noted that several other states of the LED may also be used. In addition, the output device is not limited to being an illumination device as described above. In some embodiments, the host device receives the input from a user operating an input control, e.g., a mouse, of the host device. In other embodiments, the host device can receive the input by operating one or more sensors of the host device. For example, if the output device of the accessory is a LED and the LED is toggled between 'ON' and 'OFF', the host device can detect the state of the LED using a camera or other photo sensor associated with the host device. Alternatively, if the host device is a portable device, the user may provide a "yes" or "no" answer by shaking the host device such that the host device can detect a number of shakes or type of shake, e.g., using an accelerometer, to determine the user's answer to the host query "Is the light illuminated?" or "Is the light flashing?." In another embodiment in which the host is a portable device, each illumination state of the accessory LED may be embodied as a selected number of flashes. In this case, after the LED flashes a certain number of times, the host may query the user, "How many times has the light flashed?", and the user may provide the answer to the query by shaking the host device by the number of times the light flashed to provide the illumination state of the output device.

The steps illustrated in blocks 402 and 404 can be repeated N times, where N is an positive integer. N can be specified either by the host device or the accessory manufacturer. A check can be made to determine whether N inputs have been received by the host device (block 406). For example, N can be 8 such that the host device receives 8 inputs associated with the 8 state selections of the output device. If N inputs have not been received, process 400 can return to block 402.

Once N inputs have been received; the host device can determine at least one identifier (block 408). In some embodiments, the identifier can be predetermined and programmed into the host device. The host device can then combine the identifier and the N inputs to generate a concatenated input (block 410). The host device can then apply an encoding algorithm to the concatenated input to generate a passcode (block 412) and pair or pair with and configure the accessory using the generated passcode (block 414). In some embodiments, the host device can compare a passcode received from the accessory to the passcode generated by the host device and grant access to the accessory only if the received passcode matches the generated passcode. In other embodiments, pairing with the accessory enables the accessory to join a network that the host is currently part of.

It will be appreciated that process 400 described herein is illustrative and that variations and modifications are possible. Acts described as sequential can be executed in parallel, order of acts can be varied, and acts can be modified or combined. For instance, in some embodiments, the host device may receive the identifier from the accessory, or the accessory can use a probe to send other information from which the host device can determine the identifier. In some embodiments the output can be an audio device, e.g., a speaker. In some embodiments, more than two identifiers can be used. In addition, in some embodiments, instead of concatenating the identifier and the N-bit code, other operations such as reordering can be performed to generate the concatenated input.

As described above, in some embodiments, the accessory can be programmed to randomly select states of its output device to generate a N-bit code. In some embodiments, after the host device receives input about a state of the output device of the accessory, the host device can inform the accessory that it has received information about the current state of the output device. Upon receiving the confirmation from the host device, the accessory can then change the state of the output device. For example, after the accessory turns on the LED and the host device receives the user's answer to the host's query, the host device can inform the accessory that it has received the LED "on" status information and that the accessory can now select the next state of the output device. The accessory can then either keep the LED "on" or turn it "off" as the next state of the output device. In some embodiments, the host device may not inform the accessory that it has received the output device status information. In such instances, the accessory may be programmed to wait a predetermined time before outputting the next state of the output device. The time delay between successive state outputs can be fixed or variable.

In some embodiments, based on the state of the output device, a user may answer the query on the host device in a particular manner. For example, a user may answer the query more quickly if the LED is on and more slowly if the LED is off. Answering the query can result in the next probe message being sent by the host device. As described above, a probe message may be intercepted by a hacker. The potential hacker may monitor the timing between successive probe messages being sent to the accessory to determine user response to the query. For example, if time between two successive probe messages is short, e.g., 40 milliseconds, then based on the above, it may be concluded that the user probably indicated that the LED is on. If the time between the last probe and the next probe is longer, e.g., 200 milliseconds, than the time between the previous two consecutive probes, then it may be concluded that the user probably indicated that the LED is off. In order to prevent the hacker from using this information to determine the status of the output device and hence the N-bit code, the host may adjust the wait times between receiving an input and sending the next probe such that the time delay between all consecutive probes is maintained the same, e.g., 300 milliseconds. In some embodiments, the host device may randomly vary the timing of presentation of the query to the user after sending instructions to the accessory to select a next state for the output device. In this instance, the user's pattern of answering questions can be masked by the random delay introduced by the host device. This will ensure that the hacker cannot determine the status of the LED based on timing between successive instructions from the host device because the time between all consecutive probes can be the same or varied randomly.

Once the N-bit code is provided to the host device, both the accessory and the host device now have the same N-bit code. The host and the accessory can then generate a passcode based on the N-bit code as described above and use the passcode for a pairing operation.

Figure 5:
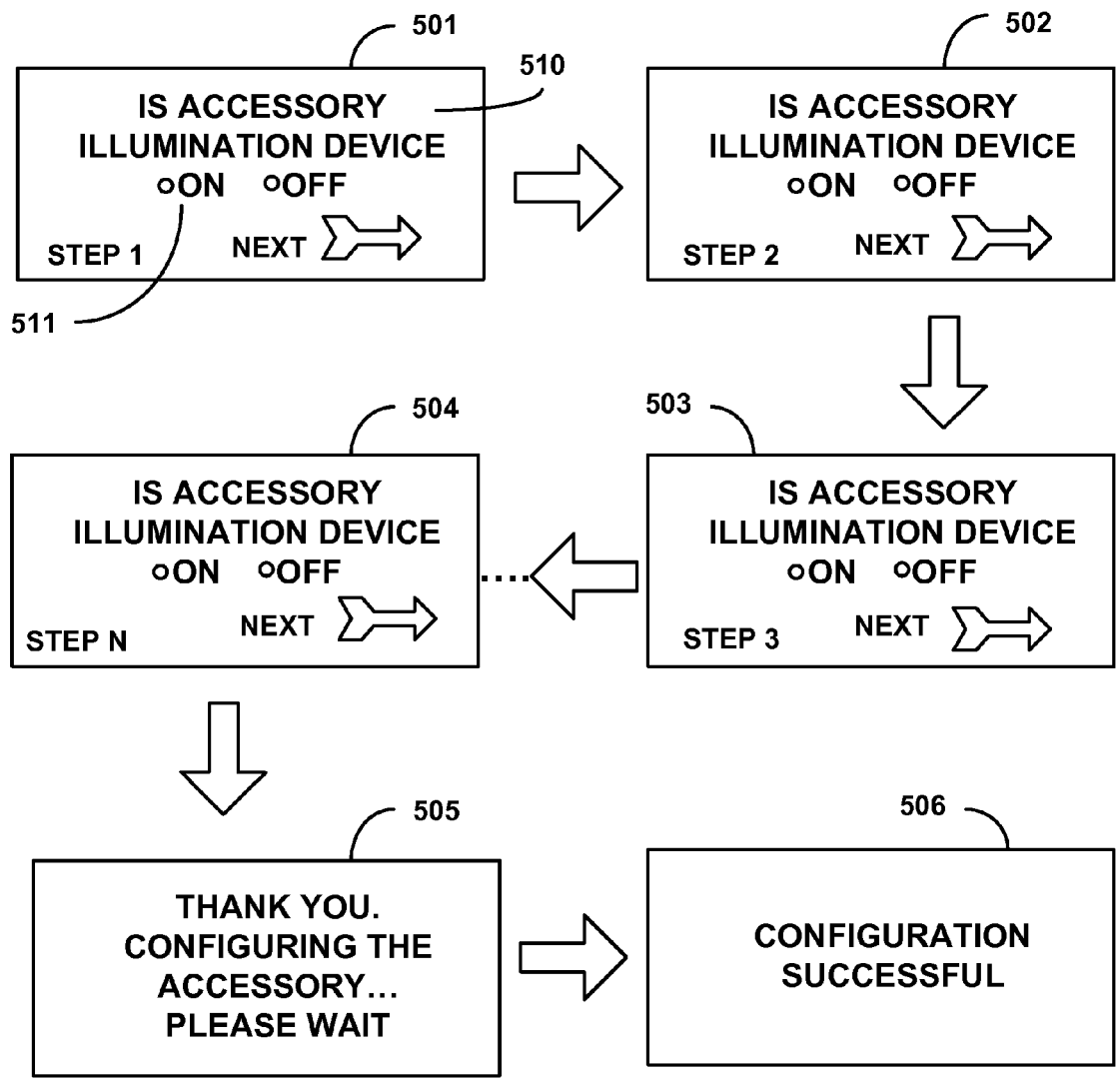
FIG. 5 is a flow diagram of a process for pairing an accessory with a host device according to an embodiment of the present invention.

As described above, in some embodiments, a host device can ask the user to enter the state of the output device of the accessory by presenting a series of simple questions to the user, e.g., on user interface 204 of host device 200 of FIG. 2. FIG. 5 illustrates sample screenshots of the query that can be displayed on the user interface of a host device according to an embodiment of the present invention. It is to be noted that FIG. 5 illustrates the scenario where the output device of the accessory is an illumination device, e.g., an LED. In the instance that the output device is an audio device, the questions presented by the host device will be different or in audible form than the ones illustrated in FIG. 5. Once skilled in the art will realize the questions presented by the host device will depend on the type of the output device of the accessory.

Screen 501 illustrates a query section 510 and an input section 511. Query section 510 can include a question that a user can answer. In some embodiments, the question can pertain to the current state of the accessory's output device. In some embodiments, a user may enter the response in input section 511, e.g., by selecting a radio button. In other embodiments, the user may enter a text response, e.g., "Yes", "No", etc. in input section 511. Once the response is received, the host device can record the response. Upon recording the response the host device may instruct the accessory to select the next state for the output device and present screen 502 to the user. The accessory in response to receiving the instruction from the host device, can select the next state of the output device. In other embodiments, the accessory can wait for a predetermined period of time, e.g., 300 ms, before selecting the next state of the output device. In this instance, the host device can also wait for the same predetermined time before presenting the next query to the user. Once the accessory has selected the next state for the output device, the user can enter that information on screen 502. Subsequently, the accessory can place the output device in another state or keep it in the previous state. The user may be asked to enter the current state of the accessory on screen 503. This process can be repeated N times until the last response is entered by the user. As described earlier, N can be a positive integer and can be specified either by the accessory manufacturer or by the host device.

After the accessory has selected the state of the output device for the $N^{th}$ time, the host device may present the user with a final screen 504 for entering information about the $N^{th}$ state of the output device. Once the user enters the input on screen 504, the host can use the received N-bit input and generate a passcode as described above. The passcode can then be used to pair with and configure the accessory. In some embodiments, the host device may present screen 505 to the user informing the user that the host device is configuring the accessory. Once the configuration is successfully completed, the host device may present a screen 506 informing the user of the successful configuration.

Although the sample screens described above illustrate the queries as being visually presented to the user, that need not be the case. In some embodiments, the queries may be presented in an audio form. For example, the host device may play a pre-recorded query through an audio device (e.g., speaker) associated with the host device. In addition, other mechanisms of capturing user input can also be used. For example, the user can be asked to "speak" the state of the output device instead of selecting or entering it in input section 511. A microphone associated with the host device can capture the user's audio input and translate it into a format that can be used by the host device to generate the passcode.

Figure 6A:
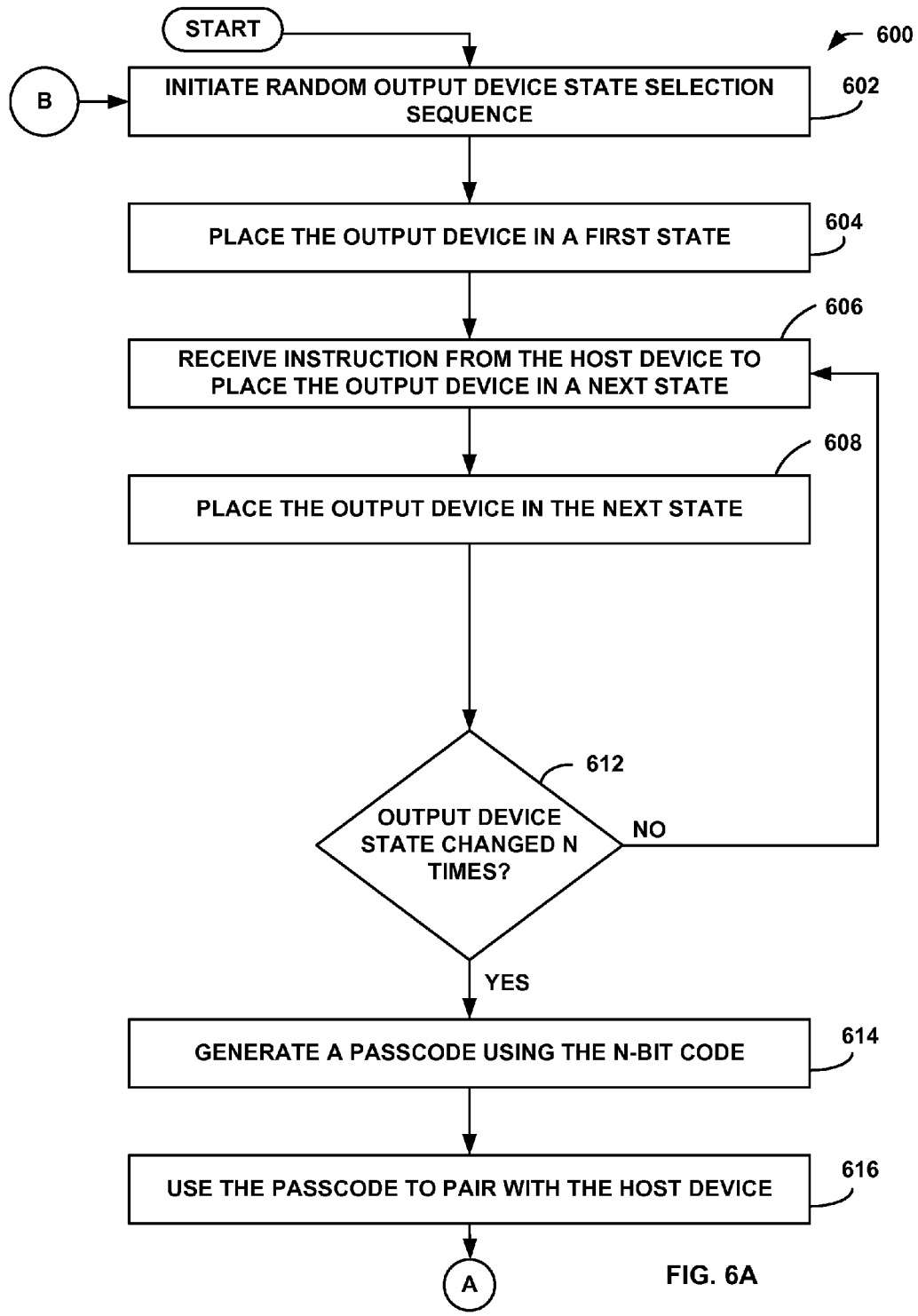
FIGS. 6A and 6B illustrate a flow diagram of a process for pairing an accessory with a host device according to another embodiment of the present invention.
Figure 6B:
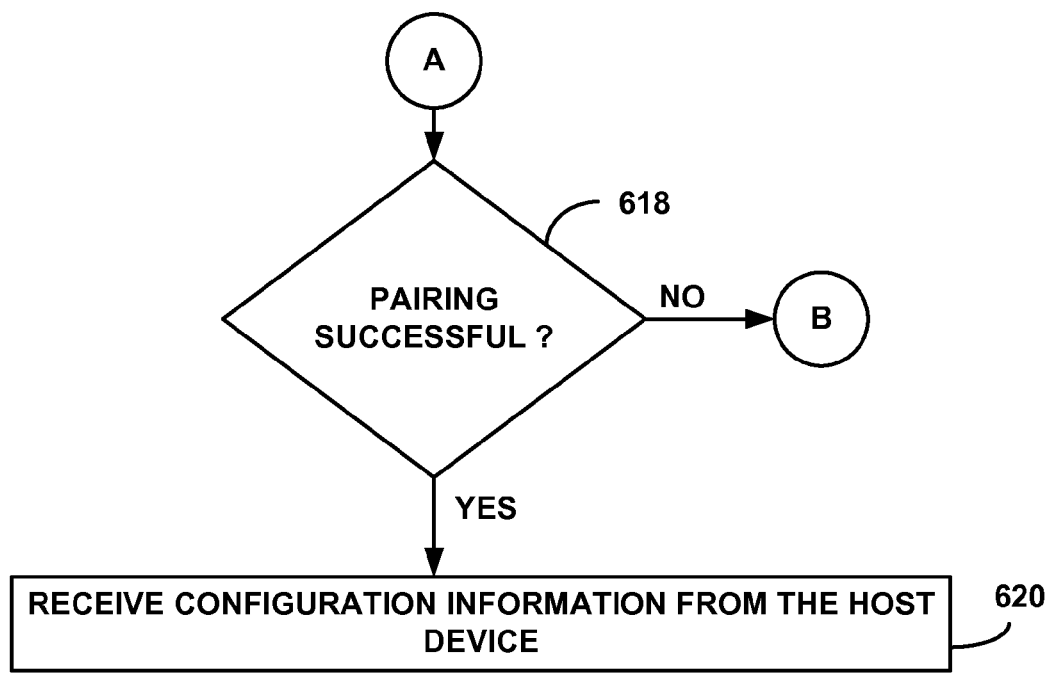

As described above, the accessory uses the same N-bit code that is provided to the host device via the user's answers to generate a passcode and access the host device to receive configuration information from the host device. FIGS. 6A and 6B illustrate a flow diagram of a process 600 for pairing an accessory with a host device according to an embodiment of the present invention. Process 600 can be performed, e.g., by accessory 300 of FIG. 3.

The accessory can initiate the process of randomly selecting the state of the output device (block 602). Thereafter the accessory can place the output device in a first state (block 604), e.g., LED is turned "on". The accessory can then receive an indication from the host device to place the output device in a next state (block 606). For instance, the accessory can receive an indication that the host has received the user's answer indicating the current (first) state of the output device and/or the host may simply instruct the accessory to place the output device in the next state. Upon receiving the indication, the accessory can place the output device in the next state (block 608). Placing the output device in the next state does not necessarily mean that the next state is different from the first state. For example, if the first state is "LED ON", the next state can also be "LED ON." Thus it is not necessary that any particular state of the output device be different from a previous state of the output device. "Next" in this context refers to the temporal or sequential aspect of the states. Any given state of the output device can be the same as or different from the previous state of the output device.

After placing the output device in the next state, the accessory can check whether the state of the output device has been changed N times (block 612). As described above, N can be a positive integer that can be predefined. If it is determined that the state of the output device has not been changed N times, process 600 can return to block 606 and the process can be repeated until the state of output device has been selected N times. After the state of the output device has been selected N times, the accessory can generate a passcode (block 614) based on the N-bit code associated with selecting the state of the output device N times as described above.

It should be noted that in some embodiments the accessory may not track the number of state changes of the output device and instead the host device may determine the number of times state selections and changes are to be made. For instance, in some embodiments, the accessory may receive a message signaling "START" prior to block 602 from host device and after N number of user answer's are received by the host device, the accessory may receive an "END" signal from the host, e.g., after block 608, indicating that no more state selections are to be made. These signals may be received by the accessory from the host device in addition to or in lieu of sending the count N to the accessory. Regardless, once the accessory identifies that no more state changes are to be made, process 600 proceeds to block 614.

In some embodiments, the passcode is generated using a similar mechanism described above in relation to FIG. 4. In some embodiments, the accessory can use information other than or in addition to the identifiers described above. As long as both the accessory and the host device use the same information, the passcodes will match. Once the passcode is generated, the accessory can use the passcode to initiate a pairing with the host device (block 616). If the pairing is successful (block 618), the accessory can receive configuration information, e.g., credentials for joining a wireless network, from the host device (block 620). If the pairing is unsuccessful, process 600 can return to block 602 where the accessory may again initiate the random state selections of the output device. In other words, the generated passcode can only be used once to attempt the pairing with the host device.

It will be appreciated that process 600 described herein is illustrative and that variations and modifications are possible. Acts described as sequential can be executed in parallel, order of acts can be varied, and acts can be modified or combined. For instance, in some embodiments, accessory may not receive an indication from the host that the state of the output device has been recorded by the host device. Instead, the accessory may wait for a predetermined time after selecting a state for the output device and then select the next state for the output device. In other embodiments, prior to block 602, the accessory may receive a message from the host device indicating the value of N.

As discussed above, in some embodiments, the generated passcode is for one time use only. In other words, the accessory can only make a single attempt to pair with the host device using the generated passcode. If for any reason the pairing is not successful, the generated passcode cannot be used to attempt another pairing. In such an instance, the accessory can again initiate the process of selecting the states of the output device to generate a new N-bit code. In some embodiments, configuration information can include credentials for joining a wireless network, Bluetooth pairing, etc. Once a pairing is established the host device and the accessory may exchange any desired information.

While the invention has been described with respect to specific embodiments, those skilled in the art will recognize that numerous modifications are possible. For instance, the output device need not be an illumination device. Various other audio/visual devices can be used instead, e.g., audio devices with a short and long tone or with high and low tones, etc. Also, in some embodiments, the change of state of the output device may include the output device emitting light of various colors with each color corresponding to a state. In this instance, the host device may present a query asking for the current color being emitted by the output device. In other embodiments, the host device may use sensors, e.g., a camera or a microphone, to capture the state of the output device of the accessory without the need for the user.

In some embodiments, only a subset of the N-bit code may be used for generating the passcode. For example, suppose N=10. In this instance, the host device and the accessory may choose to use 8 bits and ignore 2 bits to generate a 8-bit code use that to generate the passcode. Selection of a subset of the N inputs can be predetermined or can be based on the accessory identifier. In some embodiments, where the output device has more than two states, the host device can use more than one bit to represent each state. For example, a LED may have an ON=01 state, an OFF=10 state, and a BLINK=11 state. In some embodiments, particular bits can be assigned to particular states and the mapping information between the states and the corresponding bits can be shared between the host and the accessory. In some embodiments, the accessory can initially select one or more states for the output device and use them as "training bits" for the host device, e.g., ON, OFF, and ON. The training bits can be unique to each accessory and each accessory can send the same training bits every time to identify itself to the host device. In this instance, the host device can be programmed to ignore the training bits when generating the passcode. In some embodiments, the training bits can be used by the host device to ensure that the user is correctly identifying the state of the output device and not some other device, e.g., a power light, on the accessory.

In other embodiments, in the instance where the accessory output device state is embodied as an audible sound and it appears from the user's input that the user is having difficulty with hearing the audible state information (i.e., the user is consistently providing incorrect answers in response to host queries), the accessory may change the frequency of the audible state sounds in order to adjust to a user's particular hearing disability. In this instance, the accessory may provide an initial set of training sounds to the user prior to beginning process 600 to allow the user to acknowledge their ability to hear the audible state sounds being produced by the accessory's output device.

In some embodiments, if no input is received from the user for a certain time, the host device may generate an error message and/or stop the process of generating the passcode. This "timeout" duration can be predetermined. When the user returns to provide an input, the entire process can be restarted.

In addition, embodiments of the present invention can be realized using any combination of dedicated components and/or programmable processors and/or other programmable devices. While the embodiments described above can make reference to specific hardware and software components, those skilled in the art will appreciate that different combinations of hardware and/or software components can also be used and that particular operations described as being implemented in hardware might also be implemented in software or vice versa.

Computer programs incorporating various features of the present invention can be encoded on various non-transitory computer readable media for storage and/or transmission; suitable media include magnetic disk or tape, optical storage media such as compact disk (CD) or DVD (digital versatile disk), flash memory, and the like. Computer readable media encoded with the program code can be packaged with a compatible device or provided separately from other devices (e.g., via Internet download).

Thus, although the invention has been described with respect to specific embodiments, it will be appreciated that the invention is intended to cover all modifications and equivalents within the scope of the following claims.

What is claimed is:

1. A method for pairing with an accessory, the method comprising, by a host device:

iteratively:
instructing the accessory to select a state for an output device of the accessory;
receiving an input indicative of the selected state of the output device of the accessory; and
terminating the iterations when a particular number of inputs have been received;
in response to the receiving of the particular number of inputs, determining an identifier, wherein the identifier is common to the host device and the accessory;
concatenating the identifier and the received inputs to generate a concatenated input;
encoding the concatenated input to generate a passcode; and
pairing with the accessory based on the passcode.

2. The method of claim 1 wherein receiving an input comprises, in one instance, receiving two successive inputs indicative of a same state of the output device.

3. The method of claim 1 wherein the output device is an illumination device.

4. The method of claim 3 wherein the state of the illumination device is selected from a group consisting of an 'on' state and an 'off' state.

5. The method of claim 1 wherein the output device is an audio device.

6. A host device comprising:
a processor;
a memory coupled to the processor;
an accessory interface configured to communicate with an accessory; and
an input interface configured to receive input from a user;
wherein the processor is configured to:
send a message instructing the accessory to select a state for an output device;
receive a first input via the input interface, wherein the first input is indicative of the selected state of the output device;
repeat the send and the receive steps until a number (N) of inputs are received, wherein the N inputs together represent a random code;
encode the random code to generate a first authentication code; and
pair with the accessory using the first authentication code.

7. The host device of claim 6 wherein the processor is further configured to:
determine, prior to encoding the random code, an identifier common to the accessory and the host device;
combine the identifier and the random code to generate a concatenated input; and
encode the concatenated input to generate the first authentication code.

8. The host device of claim 6 wherein to pair with the accessory using the first authentication code, the processor is further configured to:
receive a second authentication code from the accessory;
compare the second authentication code to the first authentication code; and
allow the accessory access to the host device if the second authentication code matches the first authentication code.

9. An accessory comprising:
a processor;
an interface coupled with the processor and configured to communicate with a host device;
an output device coupled with the processor; and
a memory coupled with the processor and including program code for generating a passcode, wherein the processor in conjunction with the memory is configured to:
iteratively for a predetermined number of times:
randomly select a state for the output device;
place the output device in the selected state;
receive instructions from the host device to select a next state for the output device; and
select the next state and place the output device in the next state in response to the instructions from a host device;
after termination of the iterations, generate a random code, the random code being a sequence indicative of selected states of the output device;
determine an identifier;
combine the identifier and the random code to generate a concatenated code; and
encode the concatenated code to generate an authentication code.

10. The accessory of claim 9 wherein the processor is further configured to
access the host device using the authentication code.

11. The accessory of claim 10 wherein in the event that the accessory and the host device fail to communicate using the authentication code, the processor generates a new random code.

12. The accessory of claim 9 wherein the output device comprises an optical indicator.

13. The accessory of claim 12 wherein a first state corresponds to the optical indicator being ON and a second state corresponds to the optical indicator being OFF.

14. The accessory of claim 9 wherein the output device comprises an audio device.

15. A non-transitory computer-readable storage medium including instructions which when executed by a processor in an accessory including an output device, cause the processor to perform a method of generating an authentication code, the method comprising:
receiving a count from a host device, the count indicating a number (N) of iterations of a code-generation operation to perform;
for each of the N iterations of the code-generating operation:
randomly selecting a state for the output device of the accessory;
placing the output device in the selected state;
receiving instruction from the host device to select a next state for the output device; and
in response to the instruction, randomly selecting the next state for the output device and placing the output device in the next state; and
subsequent to the N iterations of the code-generating operation:
concatenating the N randomly selected states with at least one identifier to generate a concatenated input; and
encoding the concatenated input to generate an authentication code.

16. The computer-readable storage medium of claim 15 wherein the output device comprises an illumination device capable of displaying a plurality of colors and wherein randomly selecting a state includes randomly selecting one of the colors.

17. The computer-readable storage medium of claim 15 wherein the output device comprises an audio unit and wherein randomly selecting a state includes selecting duration of a tone to be emitted by the audio unit.

18. The computer-readable storage medium of claim 15, wherein N is at least 2 and not greater than 64.

19. The computer-readable storage medium of claim 15, wherein the identifier is received from the host device.

* * * * *